United States Patent
Hamada

(10) Patent No.: US 7,932,202 B2
(45) Date of Patent: Apr. 26, 2011

(54) $Y_2O_3$ SINTERED BODY AND CORROSION RESISTANT MEMBER FOR SEMICONDUCTOR/LIQUID CRYSTAL PRODUCING APPARATUS

(75) Inventor: Toshiyuki Hamada, Kokubu (JP)

(73) Assignee: Kyocera Corporation, Kyoto (JP)

( * ) Notice: Subject to any disclaimer, the term of this patent is extended or adjusted under 35 U.S.C. 154(b) by 773 days.

(21) Appl. No.: 10/566,332

(22) PCT Filed: Jun. 30, 2004

(86) PCT No.: PCT/JP2004/009621
§ 371 (c)(1),
(2), (4) Date: Apr. 21, 2008

(87) PCT Pub. No.: WO2005/009919
PCT Pub. Date: Feb. 3, 2005

(65) Prior Publication Data
US 2008/0207432 A1    Aug. 28, 2008

(30) Foreign Application Priority Data

Jul. 29, 2003  (JP) .................................. 2003-203187
Sep. 25, 2003  (JP) .................................. 2003-333902

(51) Int. Cl.
*C04B 35/505*    (2006.01)
(52) U.S. Cl. ....................................................... 501/152
(58) Field of Classification Search ................... 501/152
See application file for complete search history.

(56) References Cited

U.S. PATENT DOCUMENTS

| | | | |
|---|---|---|---|
| 6,838,405 B2 * | 1/2005 | Fujita et al. | ................... 501/152 |
| 7,186,391 B1 | 3/2007 | Uemura et al. | |
| 2003/0034130 A1 * | 2/2003 | Fujita et al. | ................ 156/345.1 |

FOREIGN PATENT DOCUMENTS

| IE | 911616 | | 11/1991 |
|---|---|---|---|
| JP | 63-210068 | * | 8/1988 |
| JP | 05-330911 | | 12/1993 |
| JP | 2001-139365 | | 5/2001 |
| JP | 2001-179080 | | 7/2001 |
| JP | 2001-181024 | | 7/2001 |
| JP | 2001-181042 | | 7/2001 |
| JP | 2001335367 A | | 12/2001 |
| JP | 2002-068838 | | 3/2002 |
| JP | 2002-255647 | | 9/2002 |
| JP | 2002-362966 | | 12/2002 |
| JP | 2003-055050 | | 2/2003 |
| JP | 2003-086475 | | 3/2003 |
| JP | 2004292270 | * | 10/2004 |
| JP | 2007331960 | * | 12/2007 |

OTHER PUBLICATIONS

Machine translation of Japanese document 2001181042, Jul. 2001.*

* cited by examiner

*Primary Examiner* — Karl E Group
(74) *Attorney, Agent, or Firm* — DLA Piper LLP (US)

(57) ABSTRACT

A corrosion resistant member made of the $Y_2O_3$ sintered material that contains 99.9% by weight or more Y in terms of $Y_2O_3$, and has a difference in mean crystal grain size between the surface and the inside region of the $Y_2O_3$ sintered material not larger than 30 μm.

8 Claims, 1 Drawing Sheet

Y₂O₃ SINTERED BODY AND CORROSION RESISTANT MEMBER FOR SEMICONDUCTOR/LIQUID CRYSTAL PRODUCING APPARATUS

BACKGROUND OF THE INVENTION

1. (Field of the Invention)

The present invention relates to a $Y_2O_3$ sintered material, a corrosion resistant member and a method for manufacturing the same, and members of a semiconductor/liquid crystal manufacturing apparatus. The $Y_2O_3$ sintered material and the corrosion resistant member of the present invention are particularly suitable for members of a semiconductor/liquid crystal manufacturing apparatus that are required to have high resistance against corrosion by corrosive gases or plasma thereof, such as chamber, microwave introducing window, shower head, focus ring, shield ring or the like.

2. (Description of the Related Art)

In recent years, plasma treatment technology has been widely employed in etching, film deposition and other processes of manufacturing semiconductor or liquid crystal devices. Such processes utilize much corrosive gases that have reactive power such as those based on fluorine, chlorine or other halogen element. Accordingly, members of the semiconductor/liquid crystal manufacturing apparatus that are exposed to corrosive gas or plasma thereof are required to have high corrosion resistance.

In the prior art, such corrosion resistant members have been formed from quartz glass or corrosion resistant metals such as stainless steel and aluminum.

In addition to the above, ceramic materials have also been used to form the corrosion resistant member, such as sintered alumina, sintered aluminum nitride, or such sintered ceramic material coated with another ceramics such as silicon carbide.

More recently, instead of the ceramics described above, use of highly corrosion resistant materials such as sintered yttrium aluminum garnet (YAG) and $Y_2O_3$ sintered material to form the corrosion resistant member has come to be viewed as very promising.

$Y_2O_3$ sintered material, in particular, is regarded as excellent in corrosion resistance for the reasons described below. The $Y_2O_3$ sintered material, when $Y_2O_3$ included therein is exposed to a corrosive gas that contains a halogen element such as fluorine-based gas, yields products consisting mainly of $YF_3$. For example, reaction of chlorine-based gas and $Y_2O_3$ results in products consisting mainly of $YCl_3$. These reaction products have melting points ($YF_3$: 1152° C., $YCl_3$: 680° C.) that are higher than those of reaction products generated through reaction of the gas with quartz glass or sintered aluminum oxide that has been used in the prior art (−90° C. of $SiF_4$ or 1040° C. of $AlF_3$ in the case of fluorine-based gas, −70° C. of $SiCl_4$ or 178° C. of $AlCl_3$ in the case of chlorine-based gas,). Since the reaction products ($YF_3$, $YCl_3$) have high melting points, $Y_2O_3$ sintered material resists corrosion even when exposed to plasma of corrosive gas at a high temperature.

Technologies applied to members made of $Y_2O_3$ sintered material subjected to exposure to corrosive gas containing a halogen element and/or plasma thereof are disclosed in patent documents 1 through 8.

Patent Document 1 (Japanese Unexamined Patent Publication (Kokai) No. 2001-139365) describes the use of a sintered ceramic material that contains an oxide of rare earth element and has thermal conductivity of 40 W/m·K or less and total radiation ratio of 80% or less in a temperature range from the room temperature to 500° C.

Patent Document 2 (Japanese Unexamined Patent Publication (Kokai) No. 2001-179080) describes a member for substrate processing of low metal contamination made of $Y_2O_3$ having relative density of 94% or higher and purity of 99.5% or higher.

Patent Document 3 (Japanese Unexamined Patent Publication (Kokai) No. 2001-181024) describes a ceramic member that contains 30% by weight or more $Y_2O_3$ and has void ratio higher than 3% and not higher than 8%.

Patent Document 4 (Japanese Unexamined Patent Publication (Kokai) No. 2002-68838) describes a plasma-resistant member characterized in that at least surface region thereof is made of $Y_2O_3$ sintered material.

Patent Document 5 (Japanese Unexamined Patent Publication (Kokai) No. 2002-255647) describes a $Y_2O_3$ sintered material having contents of trace metallic components containing 200 ppm or less Si, 100 ppm or less Al and 200 ppm or less in total of Na, K, Ti, Cr, Fe and Ni in terms of concentration by weight.

Patent Document 6 (Japanese Unexamined Patent Publication (Kokai) No. 2003-55050) describes a $Y_2O_3$ sintered material having contents of trace metallic components containing 400 ppm or less Si and 200 ppm or less Al in terms of concentration by weight, wherein mean grain size is 200 μm or less and void ratio is 5% or less.

Patent Document 7 (Japanese Unexamined Patent Publication (Kokai) No. 2001-181042) describes a $Y_2O_3$ sintered material made of $Y_2O_3$ having relative density of 96% or higher.

Patent Document 8 (Japanese Unexamined Patent Publication (Kokai) No. 5-330911) describes a $Y_2O_3$ matrix made by adding titanium oxide or the like to $Y_2O_3$.

SUMMARY OF THE INVENTION

Technical Problems to be Solved $Y_2O_3$ sintered material is generally difficult to sinter, and therefore requires it to fire at a high temperature higher than 1500° C. in the case of densification in air atmosphere (disclosed in, for example, Patent Documents 4 and 8). When firing at a high temperature, however, in case a fine powder having mean crystal grain size of 1 μm or less is used, temperature raising rate is made faster, or a firing fixture having a low melting point is used for placing a compact thereon for the purpose of improving the sintering performance, there has been such a problem that sintering proceeds rapidly from the surface during firing, thus resulting in a difference in crystal grain size between the surface and a region deep inside of the sintered material.

The inventor of the present application found that the difference in crystal grain size between the surface and inside region of the sintered material is closely associated with the corrosion of the sintered material and the generation of particles from the sintered material. That is, in case there is a difference in crystal grain size between the surface and inside region of the sintered material, internal stress generated in the sintered material increases resulting in lower mechanical strength, thus causing such problems as described below: The sintered material can be used without problem in a normal atmosphere. However, when used in a corrosive gas atmosphere, particularly corrosive gas containing a halogen element or plasma thereof, cracks occur in the surface of the sintered material due to corrosion and interaction of the internal stress of the sintered material with the cracks and cause breakage or the like thus resulting in a lower mechanical strength.

Based on many experiments and theoretical study conducted by the present inventor, a mechanism described below is assumed to cause the problems described above to occur from the difference in crystal grain size: In case a sintered material is used in a corrosive gas atmosphere containing a halogen element or plasma thereof, when there is difference in crystal grain size between the surface and inside region of the sintered material, corrosion of the surface of the sintered material or temperature gradient in the sintered material gives rise to a large stress tensor between the crystal located near the surface and the crystal located deep inside, and the stress tensor generates a large internal stress within the sintered material. Increasing internal stress leads to increasing lattice strain of the crystal, thus resulting in increasing lattice defects (vacancy of Y or O that constitutes the crystal lattice of the $Y_2O_3$ sintered material, and/or disturbance in the location of Y or O in the lattice). As a result, atoms located at or adjacent to the lattice defects are put into instability of electrical property and crystalline structure, thus leading to weaker bonding between crystal grains. The crystal having weaker bonding between crystal grains is considered to be susceptible to crack in the surface due to corrosion, and therefore becomes brittle to stress applied from the outside (mechanical strength decreases).

It has been pointed out, as described in Patent Documents 5 through 7, that it is effective to limit the contents of metal elements of the remaining portion of the $Y_2O_3$ sintered material in improving the corrosion resistance and suppressing the generation of particles.

However, the trends of decreasing sizes of semiconductor chips and liquid crystal panels and increasing density of circuits in recent years have been causing stronger requirements on the members to have such a high level of corrosion resistance that can resist corrosion in the etching or film deposition process in a semiconductor manufacturing apparatus or a liquid crystal manufacturing apparatus and suppress the generation of particles. These requirements cannot be satisfied by the level of corrosion resistance of the corrosion resistant member of the prior art.

It was found that, when the sintered material has a difference in crystal grain size between the surface and inside region of the sintered material as described above, in particular, it is difficult to achieve a high level of corrosion resistance that is recently required, specifically corrosion resistance of such a level as the etching rate does not become higher even after being exposed to corrosive gas plasma containing a halogen element for several tens of thousands of hours, such a level as the amount of particles does not pose a problem even when used in semiconductor chips with wiring pattern of several tens of nanometers in width, simply by decreasing the contents of metallic elements of the remaining portion of the sintered material. This is supposedly for the following reason. That is, when there is a difference in crystal grain size between the surface and the inside region of the sintered material, internal stress increases resulting in increasing lattice defects, as described above. An increase in lattice defects leads to instability of electrical property and crystalline structure of atoms that constitute the crystal lattice. When the atoms located in lattice defects are exposed to a corrosive gas containing a halogen element or plasma thereof, the atoms readily react with the halogen element to form a compound of the halogen element. The halogen compound generated from the atoms located in lattice defects through a reaction with the halogen compound may form particles on the surface of the sintered material, form particles which are released to the outside of the sintered material, or be etched by the halogen gas plasma starting near the surface of the sintered material.

As a result, it becomes difficult to maintain stability of electrical property and crystalline structure of the atoms located adjacent to the atoms that are in lattice defects, as well. This is believed to cause similar phenomenon to propagate further to neighboring atoms so that corrosion or etching by the formation of compounds of halogen element proceeds. Since the corrosion or etching proceeds successively as described above, it is believed that the etching rate and the amount of particles cannot be decreased sufficiently even when the contents of metal elements are decreased.

When titanium oxide is added to $Y_2O_3$ sintered material as described in Patent Document 8, although sintering operation can be carried out at a lower temperature resulting in a reduction of manufacturing cost, proportion of crystal phase other than $Y_2O_3$ increases thus resulting in lower corrosion resistance.

It was also found that the difference in crystal grain size between the surface and inside region of the sintered material is associated also to color unevenness of the surface. Specifically, while light incident on the sintered material is absorbed in the interface of crystal grains or reflected on the surface, the absorptivity, angle of reflection and reflectivity are believed to vary greatly depending on the difference in crystal grain size. Accordingly, an ordinary body of $Y_2O_3$ sintered material shows white color but a body of a $Y_2O_3$ sintered material with difference in crystal grain size between the surface and inside region of the sintered material looks partially yellow or gray because of difference in reflection and absorption of light between the crystal grains located near the surface and the crystal grains located deep inside. This can be seen by polishing a cut surface of the sintered material and observing the cut surface, where the peripheral portion and the inside show different colors.

The present invention has been made on the basis of the findings described above. An object of the present invention is to provide a $Y_2O_3$ sintered material and a corrosion resistant member that maintain high corrosion resistance and high mechanical strength with less color unevenness on the surface in a corrosive gas environment containing a halogen element or plasma thereof and a method for manufacturing the same, and semiconductor/liquid crystal manufacturing apparatus.

Solution for the Problem

The present inventors have studied based on the findings described above, and found that controlling the difference in crystal grain size between the surface and the inside region of the $Y_2O_3$ sintered material within 30 μm makes it possible to make a corrosion resistant member that maintains high corrosion resistance and high mechanical strength with less color unevenness on the surface when used in a corrosive gas environment containing a halogen element or plasma thereof, and accordingly completed the present invention.

Specifically, the $Y_2O_3$ sintered material of the present invention contains 99.9% by weight or more Y in terms of $Y_2O_3$, and has a difference in crystal grain size between the surface and the inside region not larger than 30 μm.

The present invention also provides a corrosion resistant member that contains 99.9% by weight or more Y in terms of $Y_2O_3$, and has a difference in crystal grain size between the surface and the inside region of the $Y_2O_3$ sintered material not larger than 30 μm.

It is preferable that the $Y_2O_3$ sintered material contains at least metal element of AE (AE represents group II elements of the periodic table).

The present invention also provides a corrosion resistant member wherein the $Y_2O_3$ sintered material further contains any one of Si, Fe and Al.

The present invention also provides a corrosion resistant member wherein the $Y_2O_3$ sintered material further contains any of metallic elements Si, Fe, Al and AE (these metallic elements will hereinafter be collectively referred to as metal elements M), in concentrations of 300 ppm of less for Si in terms of $SiO_2$, 50 ppm or less for Fe in terms of $Fe_2O_3$, 100 ppm or less Al in terms of $Al_2O_3$ and 350 ppm or less AE in terms of AEO.

The present invention also provides a corrosion resistant member wherein the ratio of content of any of the metal elements M contained in and near the surface to the content of the metal elements M contained deep inside of the $Y_2O_3$ sintered material is in a range from 0.2 to 5.

The present invention also provides a corrosion resistant member wherein the $Y_2O_3$ sintered material shows dielectric loss tangent of $2\times10^{-3}$ or less in a frequency range from 10 MHz to 5 GHz.

It is preferable that the carbon content in the $Y_2O_3$ sintered material is 100 ppm by weight or less. A corrosion resistant member wherein the $Y_2O_3$ sintered material has void ratio of 5% or less is also provided.

The present invention also provides a corrosion resistant member wherein the $Y_2O_3$ sintered material has density of 4.8 $g/cm^3$ or higher.

The present invention also provides a method for manufacturing the corrosion resistant member as described below:

The manufacturing method comprises the steps of
preparing a powder having a mean particle size of 1 μm or less that contains 99.9% by weight of $Y_2O_3$ with the rest consisting of any of $SiO_2$, $Fe_2O_3$, $Al_2O_3$ and AEO,
forming the powder into a compact, and
heating the compact at a rate of 50° C. per hour and firing the compact at a temperature from 1500 to 2000° C.

It is preferable to place the compact on a firing fixture that has melting point higher than 2000° C.

It is preferable that the powder contains all of $SiO_2$, $Fe_2O_3$, $Al_2O_3$ and AEO, in concentrations by weight of 250 ppm of less for $SiO_2$, 40 ppm or less for $Fe_2O_3$, 50 ppm or less for $Al_2O_3$ and 250 ppm or less for AEO.

It is also preferable that the corrosion resistant member is used in an atmosphere exposed to a corrosive gas containing a halogen element or plasma thereof.

Technical Effects Superior to Prior Arts

When the difference in the mean crystal grain size between the surface and the inside region of the $Y_2O_3$ sintered material is made small to be not larger than 30 μm, it is made possible to decrease the stress tensor acting between the crystal located in the surface or near the surface and the crystal located deep inside, thereby to suppress the internal stress of the $Y_2O_3$ sintered material. As a result, lattice defects of the crystal can be suppressed from increasing, thereby achieving stability of the atoms that constitute the $Y_2O_3$ crystal in terms of electrical property and crystalline structure. This enables it to maintain the bonding between the crystal grains, keep the mechanical strength against external stress from decreasing and prevent breakage and cracks from occurring.

Since the corrosion resistant member of the present invention suppresses the internal stress of the $Y_2O_3$ sintered material and the lattice defects from increasing as described above, it achieves stability of electrical property and crystalline structure so that generation of particles and progress of etching can be suppressed, thus improving the corrosion resistance.

Moreover, since the $Y_2O_3$ sintered material of which mean crystal grain size is made smaller is capable of suppressing the hue, lightness and chromaticness from varying due to differences in the absorptivity, angle of reflection and reflectivity for light in the interface of crystal grains, and therefore color unevenness can be mitigated.

Thus since semiconductor/liquid crystal manufacturing apparatus made of the corrosion resistant member of the present invention provides excellent corrosion resistance when exposed to corrosive gas that contains a halogen element or plasma thereof in the manufacturing apparatus, frequency of replacing the components parts can be reduced and the manufacturing cost can be decreased.

DESCRIPTION OF THE BEST EMBODIMENTS

Figure 1:
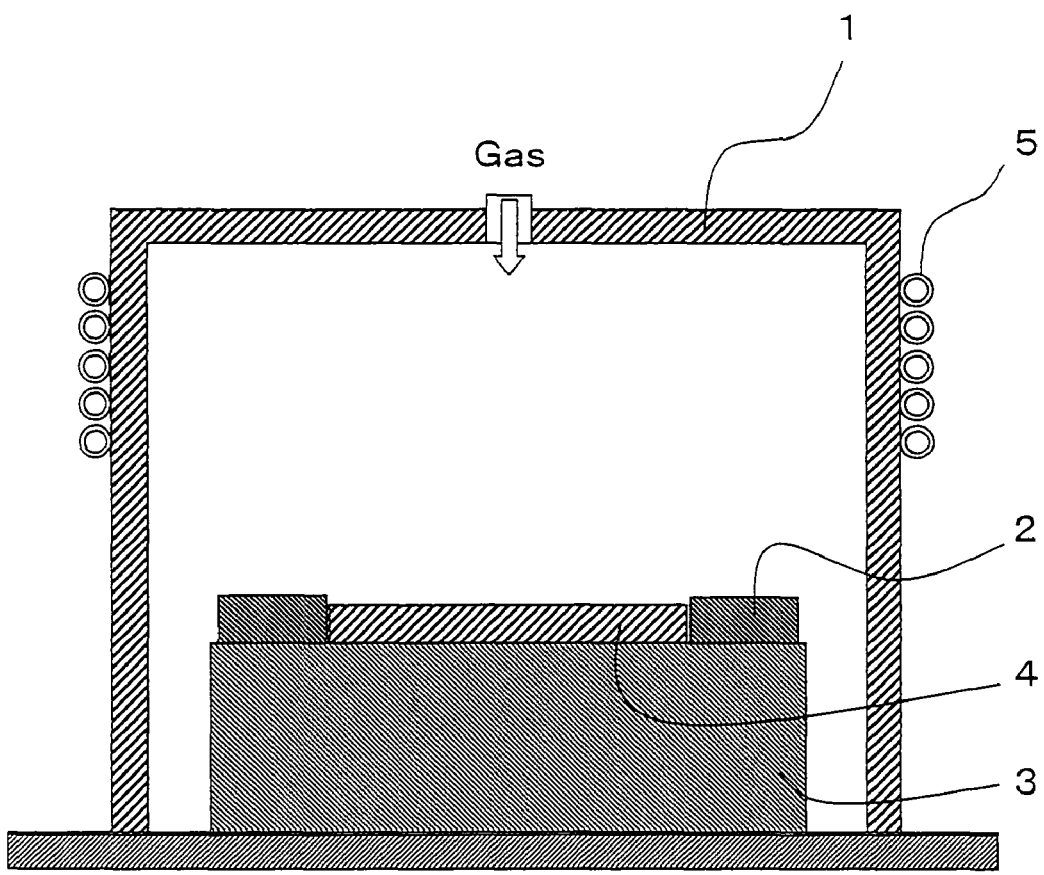
FIG. 1 is a schematic diagram showing an example of etching apparatus wherein the corrosion resistant member of the present invention is used.

Best mode of carrying out the invention will now be described in detail.

The corrosion resistant member of the present invention is constituted from $Y_2O_3$ sintered material that contains 99.9% by weight or more Y in terms of $Y_2O_3$, and has the difference in crystal grain size between the surface and the inside region of the $Y_2O_3$ sintered material not larger than 30 μm.

A $Y_2O_3$ sintered material that contains Y in a concentration less than 99.9% by weight in terms of $Y_2O_3$, cannot exhibit the sufficient corrosion resistance characteristic of the present invention. It is more preferable that 99.95% by weight or more Y is contained in terms of $Y_2O_3$. This decreases impurities in the $Y_2O_3$ crystal so that lattice defects can be decreased further, thereby improving the corrosion resistance.

In this specification, the phrase "deep inside of the $Y_2O_3$ sintered material" means substantially the mid portion in the direction of thickness of the sintered material. The mean crystal grain size in the surface is determined by observing the surface by means of a metallurgical microscope or a scanning electron microscope with a factor of magnification of about 50 to 2000 and taking a photograph of the surface. The grain sizes of a plurality of crystal grains shown in the photograph are measured, and the grain sizes are averaged to obtain the mean crystal grain size. The mean crystal grain size deep inside of the $Y_2O_3$ sintered material is determined by polishing a cut surface of the $Y_2O_3$ sintered material to mirror finish, and observing the surface under a metallurgical microscope or a scanning electron microscope (SEM). When the crystal grains located deep inside have blurred profile under the SEM observation and it is difficult to measure the grain size, it is preferable to apply heat treatment or chemical treatment to etch the grain boundary of the sample and then photograph the surface under SEM. Crystal grains measuring 0.5 μm or less across are excluded from the calculation of mean crystal grain size, since such small grains have insignificant effect on the mechanical strength and color unevenness.

The difference in crystal grain size between the surface of the $Y_2O_3$ sintered material and the inside region of the $Y_2O_3$ sintered material is set to 30 μm or less because the internal stress of the sintered material becomes greater and lattice defects of the crystal increase when the difference is larger, thus resulting in a decrease in the mechanical strength of the sintered material and in the occurrence of color unevenness. Therefore, in order to effectively suppress the color unevenness and maintain mechanical strength, the difference in mean crystal grain size between the surface and the inside region of the $Y_2O_3$ sintered material is preferably controlled to 15 μm or less, more preferably to 8 μm or less.

Color of the $Y_2O_3$ sintered material of which mean difference in crystal grain size between the surface and the inside region is controlled to 30 μm or less is represented as follows in terms of hue H, lightness V and chromaticity C with Munsell color code (HV/C). Achromatic colors have hue values H in a range from 9.0 to 10.0N. Chromatic colors have hue values H of 5R (red), from 8.0 to 10.0YR (yellowish red) or from 0.1 to 5Y (yellow), lightness values V in a range from 7.0 to 10.0 and chromaticity values C in a range from 0.5 to 3. When the difference in mean crystal grain size between the surface and the inside region of the sintered material is larger than 30 μm, in contrast, achromatic colors have hue values H higher than 9.0N, while chromatic colors have hue values H of 5R (red), from 8.0 to 10.0YR (yellowish red) or from 0.1 to 5Y (yellow), lightness values V are outside of a range from 7.0 to 10.0 and chromaticity values C are outside of a range from 0.5 to 3.0. When the difference in mean crystal grain size is not greater than 15 μm, achromatic colors have hue values H in a range from 9.0 to 10.0N, while chromatic colors have hue values H in a range from 8.0 to 10.0YR (yellowish red) or from 0.1 to 5Y (yellow), lightness values V in a range from 7.0 to 10.0 and chromaticity values C in a range from 0.5 to 3.0, with a tendency of decreasing variability in chromaticity value, thus making it possible to suppress color unevenness. When the difference in mean crystal grain size is not greater than 8 μm, there is a tendency of further decreasing variability of chromaticity values C that are in a range from 0.5 to 2, thus making it possible to further suppress color unevenness. For the purpose of the present invention, color measurements can be made by means of a calorimeter and a color difference meter that are commercially available.

The $Y_2O_3$ sintered material may contain at least a metallic element of AE (AE represents group II elements of the periodic table). Among the group II elements, Ca, Mg, Sr and Ba are preferably used and more preferably Ca is used. When the group II elements are contained in the $Y_2O_3$ sintered material, excessive content of group II elements leads to the generation of oxides of Y and AE in the grain boundary. When the amounts of the oxides increase, intergranular phase tends to be formed in the $Y_2O_3$ crystal, thus making it difficult to significantly improve the corrosion resistance. In case the content of AE is not higher than 350 ppm in terms of AEO, most of the AE forms solid solution with the crystal lattice of $Y_2O_3$, while hardly existing in the grain boundary of the $Y_2O_3$ crystal, so that corrosion resistance is rather improved.

While the reason why corrosion resistance is improved when AE forms solid solution with the crystal lattice of $Y_2O_3$ is not clarified, it is supposedly due to such a mechanism as described below: In a corrosive gas that contains a halogen element, for example plasma of $CF_4$ gas, a part of $CF_4$ turns into $CF_3$ radical, cation $CF_3^+$ and anion $F^-$. $CF_3$ radical and cation $CF_3^+$ collide onto the surface of the sintered material so as to generate particles. Cation $F^-$, on the other hand, reacts with $Y^{3+}$ and produces $YF_3$ that corrodes the sintered material. During this process, the quantity of particles generated through the collision of the radical and the cation remains substantially constant regardless of the reaction of AE with the crystal lattice of $Y_2O_3$ to form solid solution. However, corrosion of the crystal lattice of $Y_2O_3$ by the anions such as $F^-$ is significantly mitigated by the reaction of AE with the crystal lattice of $Y_2O_3$ to form solid solution. As a result, the internal stress is reduced by setting the difference in crystal grain size to 30 μm or less as in the present invention, and corrosion resistance can be improved further by causing the AE to react with the crystal lattice of $Y_2O_3$ to form solid solution.

The mechanism by which the amount of $YF_3$ generated from $F^-$ or the like decreases so as to further improve the corrosion resistance as the AE forms solid solution is considered as follows: AE has valence of plus 2, and oxide thereof has chemical stability at high temperatures. By causing the AE to react with the crystal lattice of $Y_2O_3$ to form solid solution, proper number of holes can be produced. As the holes react with anion such as $F^-$, charges of the holes and the anions are canceled out, so as to suppress the reaction between $Y^{3+}$ and $F^-$ in comparison to a case where the AE does not react with the crystal lattice of $Y_2O_3$ to form solid solution. As a result, the amount of $YF_3$ generated decreases, so that corrosion resistance is improved further.

As described above, controlling the AE content to within 350 ppm in terms of AEO leads to smaller amount of $YF_3$ while preventing intergranular phase from being formed from oxides of Y and AE, and therefore corrosion resistance can be improved effectively. Among the AE, concentration of Ca in particular is preferably controlled to within 100 ppm in order to improve the chemical stability in plasma of corrosive gas containing a halogen element so as to improve the corrosion resistance.

According to the present invention, the $Y_2O_3$ sintered material may also contain some of Si, Fe and Al, with Si concentration by weight of 300 ppm or less in terms of $SiO_2$, Fe concentration by weight of 50 ppm or less in terms of $Fe_2O_3$, and Al concentration by weight of 100 ppm or less in terms of $Al_2O_3$, which enables it to improve corrosion resistance further.

The mechanism by which corrosion resistance can be improved further by controlling the concentrations of Si, Fe and Al among the metal elements M (Si, Fe, Al, AE) is considered as follows:

When Si mixes into the sintered material, Si exists mainly in the form of $Si^{4+}$ having valence of plus 4. Radius of $Si^{4+}$ in the sintered material is as small as one half that of $Y^{3+}$ ion or less. Also because $Si^{4+}$ and $Y^{3+}$ have difference values of valence, Si is less likely to form a solid solution in the crystal lattice of $Y_2O_3$. When Si concentration is 300 ppm or less in terms of $SiO_2$, Si forms solid solution in the crystal lattice of $Y_2O_3$ or between the crystal lattice, and intergranular phase that contains Si and has low corrosion resistance is hardly generated, corrosion resistance can be further improved.

When Fe mixes into the sintered material, oxides of Fe, for example, $Fe_2O_3$ phase is formed in the grain boundary. Since Fe compounds such as $Fe_2O_3$ are magnetic materials, they tend to react electromagnetically with plasma when exposed to the plasma of a gas that contains a halogen element. As a result, intergranular phase that contain a Fe compound is selectively etched making it impossible to make a significant improvement in corrosion resistance. When Fe concentration is 50 ppm or less in terms of $Fe_2O_3$, Fe forms solid solution in the crystal lattice of $Y_2O_3$ or between the crystal lattice, and intergranular phase that contains a Fe compound is hardly generated so that the grain boundary is less likely to be etched by the plasma that contains a halogen element, and therefore corrosion resistance can be significantly improved.

When Al mixes into the sintered material, a trace of intergranular phase may be formed in the grain boundary, such as $YAlO_3$ of hexagonal crystal system or orthorhombic crystal system and $Y_4Al_O_9$ of monoclinic crystal system. Such an intergranular phase has the possibility of decreasing the corrosion resistance against a corrosive gas that contains a halogen element or plasma thereof. When Al concentration is 100 ppm or less in terms of $Al_2O_3$, Al forms solid solution in the crystal lattice of $Y_2O_3$ or between the crystal lattice, and intergranular phase that contains a Fe compound is hardly generated so that the grain boundary is less likely to be etched by the plasma that contains a halogen element, and therefore corrosion resistance can be significantly improved.

It is more preferable that the $Y_2O_3$ sintered material contains all of Si, Fe, Al and AE, with Si concentration being 300 ppm or less in terms of $SiO_2$, Fe concentration being 50 ppm or less in terms of $Fe_2O_3$, Al concentration being 100 ppm or less in terms of $Al_2O_3$ and AE concentration being 350 ppm or less in terms of AEO, all in concentrations by weight which enables it to improve corrosion resistance further.

It is preferable to control the contents of the metal elements M consisting of Si, Fe, Al and AE within the ranges described above, and control the ratio of content of any of the metal elements M contained in and near the surface to that contained deep inside is in a range from 0.2 to 5, more preferably from 0.3 to 3. This is because the metal elements M have an effect of accelerating the growth of $Y_2O_3$ crystal grains, and therefore concentration of the metal elements M in either the surface or deep inside makes it likely that grains of $Y_2O_3$ crystal grow particularly in that region. Higher concentration of the metal elements M in a particular region gives rise to the possibility that the difference in crystal grain size between the surface and the inside region of the $Y_2O_3$ sintered material increases beyond 30 μm, leading to troubles. Therefore, the difference in crystal grain size between the surface and the inside region of the $Y_2O_3$ sintered material can be decreased controlling the ratio of content of any of the metal elements M contained near the surface to that contained deep inside is in a range from 0.2 to 5, thereby achieving remarkable improvement of mechanical strength and reducing the color unevenness further. It is more preferable to control the ratio of content of any of the metal elements M contained near the surface to that contained deep inside to 3 or less in order to decrease the difference in crystal grain size between the surface and the inside region to 15 μm or less.

While the mechanism whereby the metal elements are distributed unevenly is not known in detail, it is supposed that the metallic elements M that are substantially evenly distributed in the compact made of $Y_2O_3$ diffuse during the firing process so as to be distributed with concentration graded from the deep inside to the surface or from the surface to the deep inside, thus resulting in higher concentration of metal elements M in either the surface or deep inside. The ratio of content of any of the metal elements M contained near the surface to that contained deep inside can be controlled by adjusting the temperature raising rate ($V_A$ in examples to be described later) during firing. Higher temperature raising rate leads to a lower ratio of content of metallic element contained near the surface to that contained deep inside, and lower temperature raising rate leads to higher ratio of content of metallic element contained near the surface to that contained deep inside. Accordingly, by controlling temperature raising rate properly during firing, it is made possible to control the ratio of contents of the metallic elements contained near the surface to that contained deep inside within the ranges described above.

Ratio of the concentration of metal elements M contained in and near the surface to that contained deep inside of the $Y_2O_3$ sintered material can be measured, for example, as follows. Samples are cut out of the sintered material from regions in and near the surface and deep inside, and are dissolved in hydrochloric acid by irradiating with microwave. Contents of metal elements Si, Fe, Al and AE in this solution are measured by ICP (inductively coupled plasma) emission spectroscopy (ICPS-8100 manufactured by Shimadzu Corporation). The contents are converted to the contents of $SiO_2$, $Fe_2O_3$, $Al_2O_3$ and AEO in the sintered material. Ratio of the content of the metal element M is determined by dividing the content of the metallic element contained near the surface by the content of the metallic element contained deep inside.

Ratio of the content of the metal element M may also be determined as follows. Surface of the sintered material, cut surface thereof near the surface and cut surface deep inside are irradiated with laser beam by means of a laser abrasion system (LSX-200 manufactured by CETAC Technologies Inc.). Atoms of the metal elements M (Si, Fe, Al, Ca, AE) are counted in the surface, near the surface and deep inside, and the ratio of the count in the surface to the count deep inside is determined for each element as the ratio of content thereof.

The $Y_2O_3$ sintered material of the present invention preferably has thickness of 2 mm or larger. This enables it to suppress the diffusion of the metal elements M from the deep region toward the surface, thereby decreasing the difference in concentration of the metal elements M between the deep region and the surface. Thus the internal stress can be decreased further so as to obtain the corrosion resistant member having higher mechanical strength.

It is preferable that the $Y_2O_3$ sintered material of the present invention has dielectric loss tangent (tan δ) of $2 \times 10^{-3}$ or less in a frequency range from 10 MHz to 5 GHz. This makes the corrosion resistant member less likely to absorb high frequency radiation and microwave generated in the semiconductor/liquid crystal manufacturing apparatus, thus reducing the undesirable heat generation and energy loss in the apparatus and achieving high efficiency of plasma generation.

When dielectric loss tangent is higher than $2 \times 10^{-3}$, much of the high frequency electromagnetic energy applied to the corrosive gas that contains a halogen element in the semiconductor/liquid crystal manufacturing apparatus is turned into thermal energy, thus resulting in a lower efficiency of plasma generation. Dielectric loss tangent is preferably $2 \times 10^{-4}$ or less.

When the mean crystal grain size is large, regions in the surface and near the surface of the sintered material and the region deep inside thereof have significantly different values of dielectric loss tangent, thus leading to significantly different amounts of heat generated in the surface and deep region as the input electromagnetic energy turns into thermal energy. Such a difference generates a significant difference in thermal expansion between the region in and near the surface and the region located deep inside, resulting in breakage of the sintered material or cracks. Preventing such breakage and crack also requires it to control the difference in mean crystal grain size to 30 μm or less.

In order to make the $Y_2O_3$ sintered material having dielectric loss tangent (tan δ) of $2 \times 10^{-3}$ or less and the difference in crystal grain size between the surface and the inside region of the sintered material within 30 μm, a powder having a mean particle size of 1 μm or less that contains 99.9% by weight or more $Y_2O_3$ with the rest consisting of some of the metal elements M is formed into a compact that is heated at a rate of 50° C. per hour and is fired at a temperature from 1500 to 2000° C. for at least 3 hours, then cooled down at a rate of 100° C. per hour or less.

Carbon content in the $Y_2O_3$ sintered material of the present invention is preferably not higher than 100 ppm by weight. By limiting the carbon content to such a low level, it is made possible to suppress the carbon contained in the sintered material from becoming free carbon that causes corrosion, with most of the carbon forming solid solution in the crystal lattice or between lattice, thereby maintaining high corrosion resistance. Also because crystal grains of the $Y_2O_3$ crystal are firmly bonded with each other by sintering, the corrosion resistant member of high mechanical strength is obtained. Also because less free carbon is generated, mobility of ions and electrons generated by the electrical effect of the free carbon can be reduced so that corrosion resistant member having smaller value of dielectric loss tangent can be obtained.

It is preferable to add a trace of carbon together with the metal elements M, for the following reason. As the metal elements M form solid solution in the crystal grains, very small amount of lattice defects are generated. Since the lattice defects are locked by the trace of carbon to prevent dislocation even at a high temperature such as 1000° C. as well as at the room temperature, the corrosion resistant member shows higher mechanical strength over a wide temperature range from the room temperature to high temperatures.

It is preferable that the void ratio of the $Y_2O_3$ sintered material of the present invention is controlled to 5% or lower. Since crystal grains that are adjacent to a void in the $Y_2O_3$ sintered material are bonded only partially with the other crystal grains, they can be easily cracked or cleaved by a mechanical force exerted from the outside. Therefore, crystal grains located adjacent to voids, when exposed to a corrosive gas that contain halogen element or plasma thereof and corroded, tend to come off and be released as particles. Crystal grains located adjacent to open voids on the surface are particularly likely to come off and be released as particles. When much particles are generated, the corrosion resistant member cannot maintain a high mechanical strength over an extended period of time.

Therefore, it is necessary to keep the void ratio at a low level and minimize the number of crystal grains that adjoin the voids, in order to reduce the particle generation and maintain a high mechanical strength over an extended period of time. In the $Y_2O_3$ sintered material of the present invention, void ratio is controlled to 5% or lower in addition to controlling the difference in crystal grain size between the surface and the inside region of the $Y_2O_3$ sintered material to 30 μm or less, so that voids are less probable to be generated and the number of crystal grains that adjoin the voids is reduced, thus resulting in the corrosion resistant member having higher corrosion resistance and improved mechanical strength with less generation of particles.

In addition, it is preferable that the $Y_2O_3$ sintered material has density of 4.8 g/cm$^3$ or higher. Since the $Y_2O_3$ sintered material having such a high density is constituted from the $Y_2O_3$ crystal grains that are firmly bonded with each other by sintering, etching can be constrained from occurring at the grain boundary even when exposed to corrosive gas containing a halogen element or plasma thereof. This provides corrosion resistant member that is more resistant against etching by corrosive gas containing a halogen element or plasma thereof. When the density is 4.9 g/cm$^3$ or higher, dielectric loss tangent can be made lower in addition to improving the corrosion resistance.

It is preferable that the corrosion resistant member of the present invention has thermal conductivity of 30 W/m·K or less. When the thermal conductivity is higher than 30 W/m·K, increased input energy to the semiconductor manufacturing apparatus for the purpose of increasing the density of the plasma escapes to the outside in the form of thermal energy, thus resulting in larger energy loss and lower productivity.

Density and void ratio can be measured by Archimedes method, carbon content can be measured by means of carbon analyzer (EMIA-511 manufactured by Horiba, Ltd.) and thermal conductivity can be measured according to the method specified in JIS R1611. When thermal conductivity is determined from thermal diffusion ratio, thermal diffusion ratio is measured by laser flash method.

The method of manufacturing the corrosion resistant member according to the present invention will now be described below.

The manufacturing method comprises:
preparing a powder having a mean particle size of 1 μm or less that contains 99.9% by weight or more $Y_2O_3$ with the rest consisting of $SiO_2$, $Fe_2O_3$, $Al_2O_3$ or AEO,
forming the powder into a compact, and
heating the compact at a rate of 50° C. per hour or lower and firing the compact at a temperature in a range from 1500 to 2000° C.

This manufacturing method decreases the difference in crystal grain size between the surface and the inside region of the $Y_2O_3$ sintered material, thus making it possible to manufacture the $Y_2O_3$ sintered material having high mechanical strength with suppressed color unevenness in the appearance.

The compact is placed on a firing fixture that has melting point higher than 2000° C., and is heated at a slow rate of 50° C. per hour or less on average and is fired at a temperature from 1500 to 2000° C., thereby to sinter uniformly all crystal grains included throughout the sintered material from the surface to deep inside, thus achieving small difference in crystal grain size between the surface and inside region of the sintered material.

The firing fixture that has melting point higher than 2000° C. is used because use of a firing fixture that has melting point not higher than 2000° C. may lead to such troubles as sticking of the compact and the firing fixture during firing, significant deformation of the corrosion resistant member thus obtained, and abnormal growth of crystal grains located in and near the surface, thus resulting in a difference in the mean crystal grain size significantly greater than 30 μm.

The difference in crystal grain size between the region near the surface and the region located deep inside of the sintered material can be remarkably decreased by using a powder that contains all of $SiO_2$, $Fe_2O_3$, $Al_2O_3$ and AEO, in concentrations by weight of 250 ppm of less for $SiO_2$, 40 ppm or less for $Fe_2O_3$, 50 ppm or less for $Al_2O_3$ and 250 ppm or less for AEO. Thus it is made possible to manufacture the corrosion resistant member from the $Y_2O_3$ sintered material having higher corrosion resistance against corrosive gas containing a halogen element or plasma thereof.

The corrosion resistant member ($Y_2O_3$ sintered material) may be manufactured as follows.

A powder that contains 99.9% by weight of $Y_2O_3$ with the rest consisting of $SiO_2$, $Fe_2O_3$, $Al_2O_3$ or AEO is put into a crushing mill as the starting material together with a medium (ion exchange water) and is mixed in a wet process to make a powder having a mean particle size of 1 μm or less, that is mixed with an organic binder so as to form a slurry. It is preferable that the starting material contains all of $SiO_2$, $Fe_2O_3$, $Al_2O_3$ and AEO, in concentrations by weight of 250 ppm of less for $SiO_2$, 40 ppm or less for $Fe_2O_3$, 50 ppm or less for $Al_2O_3$ and 250 ppm or less for AEO.

The mean particle size of the powder after crushing is set to 1 μm or less, because a powder having a mean particle size larger than 1 μm is difficult to sinter.

The crushing mill used to prepare the slurry may be a ball mill employing crushing balls or a vibration mill. In order to prevent powder that is rubbed off the crushing balls from mixing into the slurry leading to disturbance of the regular periodicity of the crystal structure of the sintered material, it is preferable to use crushing balls made of high purity $ZrO_2$ and control the content of $ZrO_2$ in the sintered material to 0.1% by weight or less.

Alternatively, a beads mill may also be used as the crushing mill. Crushing balls made of high purity $ZrO_2$ are preferably used in the beads mill similar to the case of the ball mill in order to prepare a powder consisting of smaller particles made by crushing. In this case, too, it is preferable to control the amount of wear of the $ZrO_2$ balls during crushing so as to control the content of $ZrO_2$ in the sintered material as the final product within 0.1% by weight.

As the organic binder described above, paraffin wax, wax emulsion (wax+emulsifier), PVA (polyvinyl alcohol), PEG (polyethylene glycol), PEO (polyethylene oxide) or the like are preferably used.

For the solvent, distilled water, organic solvent or the like may also be used besides ion exchange water. This enables it to suppress the $Y_2O_3$ powder from agglomeration during crushing and form a dense $Y_2O_3$ sintered material. Moreover, in case the metal elements M are contained in the sintered material in the ranges described above, it is made possible to uniformly disperse the metal elements M in the sintered material thereby to make an excellent corrosion resistant member having corrosion resistance that is uniform throughout the sintered material.

After preparing the slurry, the slurry is formed into granules by means of a spray granulation machine such as spray dryer. The granules are formed into a compact of a predetermined shape by a known method such as cast molding, extrusion molding, injection molding, tape molding, isostatic molding or pressing using a die. The compact made as a precursor of the corrosion resistant member is further processed as required.

It is preferable that contents of $SiO_2$, $Fe_2O_3$, $Al_2O_3$ and AEO contained in the compact are such that concentration of $SiO_2$ is 250 ppm or less, concentration of is $Fe_2O_3$ is 40 ppm or less, concentration of $Al_2O_3$ is 50 ppm or less for and concentration of AEO is 250 ppm or less. For that purpose, total contents of $SiO_2$, $Fe_2O_3$, $Al_2O_3$ and AEO contained in the powder of the starting material, $SiO_2$, $Fe_2O_3$, $Al_2O_3$ and AEO added to the starting material and $SiO_2$, $Fe_2O_3$, $Al_2O_3$ and AEO that may mix as impurities from the solvent, the crushing mill, the crushing balls or the like are controlled such that concentration of $SiO_2$ is 250 ppm or less, concentration of is $Fe_2O_3$ is 40 ppm or less, concentration of $Al_2O_3$ is 50 ppm or less for and concentration of AEO is 250 ppm or less, all in terms of concentration by weight.

Among $SiO_2$, $Fe_2O_3$, $Al_2O_3$ and AEO, $Al_2O_3$ is commonly used as a sintering assisting agent and has higher effect of accelerating the growth of crystal grains in the $Y_2O_3$ sintered material than other elements. Therefore, it is better to control the content of $Al_2O_3$ in the compact lower, and concentration of Al is preferably 30 ppm or less in terms of $Al_2O_3$.

The compact made as described above is degreased at a temperature in a range from 200 to 1200° C. This is because, when the degreasing temperature is below 200° C. or higher than 1200° C., a large part of carbon contained in the compact remains after firing and may become free carbon, thus resulting in a large value of dielectric loss tangent of the resultant $Y_2O_3$ sintered material, that is not desirable.

The compact that has been formed as described above is placed on a firing fixture that has melting point higher than 2000° C., for example a plate-shaped fixture made of high-purity alumina, high-purity magnesia or the like, and is heated at a rate of 50° C. per hour or less on average and is fired at a temperature from 1500 to 2000° C. for at least two hours. Since sintering of the corrosion resistant member is accelerated at temperatures higher than 1000° C. for, the target temperature for heating at a rate of 50° C. per hour or less is preferably 1000° C. or higher, and more preferably 120° C. or higher.

The firing fixture is preferably made of high-purity alumina or high-purity magnesia, and high-purity alumina is particularly preferable. The term "high-purity" used herein means a concentration not lower than 99.9% by weight. A high-purity firing fixture, for example, may be made of a material containing 99.9% by weight or more alumina or 99.9% by weight or more magnesia.

Firing temperature is set in the range from 1500 to 2000° C. because the corrosion resistant member made of the $Y_2O_3$ sintered material cannot be made sufficiently dense at a firing temperature lower than 1500° C., and a firing temperature higher than 2000° C. causes abnormal growth of the crystal grains in the corrosion resistant member resulting in lower mechanical strength. Firing temperature is maintained within the range from 1500 to 2000° C. for at least two hours, because densification of the corrosion resistant member may be partially hampered when the duration is shorter than 2 hours.

Mean heating rate is set to 50° C. per hour or less, because a heating rate higher than 50° C. per hour leads to a difference in mean crystal grain size between a region near the surface and the region deep inside of the sintered material larger than 30 μm, resulting in lower mechanical strength. It is preferable to raise the temperature at a mean rate of 50° C. per hour in a temperature range above 1200° C., which enables it to minimize the difference in mean crystal grain size. It is more preferable to raise the temperature at a rate of 15° C. per hour or lower in a temperature range above 1200° C., in a furnace having capacity of 1 m³ or more.

After holding temperature in the range from 1500 to 2000° C., the temperature is preferably lowered at a rate of 200° C. per hour or lower. This is because temperature lowering rate higher than 200° C. per hour may lead to increasing lattice defects in the sintered material, thus making it impossible to significantly improve corrosion resistance. It is particularly preferable to raise the temperature at a rate of 15° C. per hour or lower from a time during degreasing or after degreasing till the start of the firing temperature holding period. This enables it to transfer thermal energy evenly from the surface to the inside during heating, while suppressing the metal elements M from diffusing from the inside toward the surface or from a region near the surface to the inside, thereby producing the corrosion resistant member made of the $Y_2O_3$ sintered material in which the ratio of content of the metallic elements M contained in the surface to that contained deep inside is in a range from 0.2 to 5. It is also made possible to manufacture the corrosion resistant member made of the $Y_2O_3$ sintered material with significantly suppressed color unevenness and improved mechanical strength.

In case the compact is fired in an atmosphere that contains oxygen, it is preferable to fire in an atmosphere that contains 50% by volume or more, particularly 80% by volume or more oxygen with the partial pressure of oxygen controlled in a range from 0.05 MPa to 1 MPa, in order to increase the density of the sintered material. The reasons are as follows. Firing in an atmosphere that contains 50% by volume or more oxygen with a partial pressure of oxygen higher than in the air enables it to make the sintered material having higher density than that which can be achieved by firing in air. Densification of a sintered material generally requires it to purge the ambient gas, which has been taken into voids during the sintering process, to the outside. In the case of firing in air atmosphere, the ambient gas which is taken into voids is air (mainly constituted from about 21% by volume of oxygen and about 78% by volume of nitrogen). When the partial pressure of oxygen is made higher than that in air and 50% by volume or more oxygen is contained in the atmosphere, oxygen concentration in the gas that is taken into closed voids during firing becomes higher than that in the case of firing in air atmosphere. Since diffusing speed of oxygen is believed to be higher than that of nitrogen in the corrosion resistant member of the present invention, the gas which has been taken into the closed voids can be purged to the outside of the sintered material faster when the oxygen concentration in the trapped gas is higher, thus increasing the density of the sintered material.

While the metal elements M may diffuse from the atmosphere into the sintered material during firing, the contents of the metal elements M in the compact are controlled in that case so that the final contents of the metal elements M contained in the compact fall in the ranges described above.

The corrosion resistant member made of the $Y_2O_3$ sintered material of the present invention has excellent resistance against corrosive gas containing a halogen element or plasma thereof, and therefore can be used as a component of semiconductor/liquid crystal manufacturing apparatus over an extended period of time without volume loss or crack, even when exposed to corrosive gas that contains a halogen element or plasma thereof. The corrosion resistant member of the present invention can also be used as a plasma resistant member used in a semiconductor manufacturing apparatus that is required to have high durability against corrosive gas containing a halogen element or plasma thereof.

Since the present invention enables it to decrease the frequency of replacing component parts of the semiconductor/liquid crystal manufacturing apparatus, manufacturing cost can be reduced. The corrosion resistant member of the present invention is particularly suitable for use as a corrosion resistant ring of semiconductor manufacturing apparatus, among the members of the semiconductor/liquid crystal manufacturing apparatus.

Examples of corrosive gases that contain halogen elements are fluorine compounds such as $SF_6$, $CF_4$, $CHF_3$, $ClF_3$, $NF_3$, $C_4F_8$ and HF, chlorine compounds such as $Cl_2$, HCl, $BCl_3$ and $CCl_4$, and bromine compounds such as $Br_2$, HBr and $BBr_3$. When high frequency electromagnetic radiation such as microwave is introduced into an atmosphere of pressure from 1 to 10 Pa where such corrosive gas as described above is used, the gas is turned into plasma that makes contact with the members of the semiconductor manufacturing apparatus. In order to improve the effect of dry etching, an inert gas such as Ar is introduced along with the corrosive gas described above thereby to generate plasma. Materials that can be etched by the corrosive gases contain oxide film-based materials (th-$SiO_2$, PSG, BPSG, HTO, P—$SiO_2$, P-TEOS, SOG, etc.), nitride film-based materials (P—SiN, LP—SiN, etc.), silicon-based material (Si, Poly-Si, a-Si, WSi, MoSi, TiSi, etc.) and metallic materials (Al, Al alloy, TI, TiN, TiW, W, Cu, Pt, Au, etc.).

An etching apparatus that employs the corrosion resistant member of the present invention is shown in FIG. 1.

Reference numeral 1 denotes a chamber, 2 denotes a clamp ring or a focus ring, 3 denotes a lower electrode, 4 denotes a wafer and 5 denotes an induction coil. In the apparatus shown in FIG. 1, a corrosive gas that contains a halogen element is injected into the chamber 1 and high frequency electric current is supplied to the induction coil 5 that is wound around the chamber, thereby to turn the corrosive gas that contains a halogen element into plasma. At the same time, high frequency power is supplied to the lower electrode to generate a bias, and the wafer 4 that is secured by the clamp ring 2 is etched. As the plasma generated in the apparatus touches the chamber 1 and the clamp ring 2 that secures the wafer 4, these components are particularly prone to corrosion. Therefore, the chamber 1 and the clamp ring 2 may be formed from the corrosion resistant member of the present invention so as to exhibit excellent corrosion resistance and prevent cracks from occurring due to thermal shock.

The present invention can be applied to members that are required to have high corrosion resistance against corrosive gases or plasma thereof, among the components of the semiconductor/liquid crystal manufacturing apparatus (etcher, CVD, etc.) such as chamber, clamp ring, microwave introducing window, nozzle, shower head, focus ring and shield ring.

EXAMPLE 1

Powders of $Y_2O_3$, $SiO_2$, $Fe_2O_3$, $Al_2O_3$, CaO and MgO were put as starting materials into a crushing mill with ion exchange water used as a solvent, and were crushed in wet process using $ZrO_2$ balls so as to achieve mean crystal grain size $D_p$ shown in Table 1 after crushing. Then 1% by weight of PVA (polyvinyl alcohol), 2% by weight of PEG (polyethylene glycol) and 1% by weight of PEO (polyethylene oxide) in proportion to the weight of powder were added as organic binder, thereby to prepare slurry. Concentrations by weight of $SiO_2$, $Fe_2O_3$, $Al_2O_3$, CaO and MgO in the starting material were 250 ppm of less for $SiO_2$, 40 ppm or less for $Fe_2O_3$, 50 ppm or less for $Al_2O_3$ and 250 ppm or less in total for CaO and MgO.

After preparing the slurry, the slurry was sprayed, dried and granulated. The granules were formed into a plurality of compacts by isostatic molding process and were cut in cylindrical shape measuring 60 mm in outer diameter and 50 mm in thickness. The compacts were degreased by heating at a rate of 100° C. per hour and holding the temperature TD shown in Table 1 for 3 hours, thereby to remove the organic binder so that residual carbon content decreases to 200 ppm or less and make degreased compacts. The degreased compact was placed on a firing fixture made of high-purity alumina or high-purity magnesia (purity 99.8% by weight or higher), and was heated at a temperature raising rate of $V_A$ shown in Table 1 in an atmosphere of oxygen/nitrogen mixture gas with partial pressure of oxygen 0.062 MPa and partial pressure of nitrogen 0.04 MPa. After holding the firing temperature $T_s$ shown in Table 1 for 3 hours, the temperature was lowered at a rate of $V_B$ shown in Table 1. Content of Y in the sintered material prepared as a sample of the present invention was measured by ICP (inductively coupled plasma) emission spectroscopy (ICPS-8100 manufactured by Shimadzu Corporation) and was converted to content of $Y_2O_3$ (% by weight). The sintered material was evaluated for the following properties.

(Difference ΔD in Mean Crystal Grain Size Between Surface and Inside)

After polishing a cut surface of the sintered material to mirror finish, intergranular phase of the crystal was etched and the crystal grain size was measured by means of scanning electron microscope (S-800 manufactured by Hitachi Lid.), thereby to determine the difference ΔD in mean crystal grain size between the surface and the inside. Crystal grains of sizes not larger than 0.5 μm were excluded from the measurement.

(Bending Strength)

Samples for bending strength measurement including the surface of the sintered material and samples for bending strength measurement including the inner portion of the sintered material were cut out and bending strength was measured in accordance to JIS R1601 (1995).

(Contents of Metal Elements (Si, Fe, Al, Ca, Mg))

Samples of the sintered material weighing 0.1 g were cut off from five positions from each of the surface and inside region, 10 samples in all. The samples were dissolved in 50 ml of an aqueous solution of hydrochloric acid (weight proportions of hydrochloric acid to water being 1:1) by irradiating with microwave. Contents by weight of Si, Fe, Al, Ca and Mg in the solutions were measured by ICP (inductively coupled plasma) emission spectroscopy (ICPS-8100 manufactured by Shimadzu Corp.). These measurements were converted to the contents of oxides ($SiO_2$, $Fe_2O_3$, $Al_2O_3$, CaO and MgO) contained in the sintered material. These values were averaged separately for the surface region and the inside region of the sintered material, to determine the contents of metal elements (Si, Fe, Al, Ca, Mg) in terms of the oxides ($SiO_2$, $Fe_2O_3$, $Al_2O_3$, CaO and MgO).

(Ratio of Metal Element Content (Si, Fe, al, Ca, Mg))

Surface of the sintered material, cut surface thereof near the surface and cut surface deep inside were irradiated with laser beam by means of a laser abrasion system (LSX-200 manufactured by CETAC Technologies Inc.) and the evaporated material was analyzed by means of an ICP mass spectroscope (Platform ICP manufactured by Micromass MS Technologies). Thus atoms of the metal elements (Si, Fe, Al, Ca, Mg) were counted in the surface and deep inside, and the ratio of the count in the surface to the count deep inside was determined for each element as the ratio of content thereof.

(Dielectric Loss Tangent Tan δ)

Dielectric loss tangent tan δ was measured in a frequency range from 2 GHz to 3 GHz by cavity resonance method.

(Density and Void Ratio of Sintered Material)

Apparent density of the Archimedes method was measured by using ion exchange water.

(Evaluation of Color Unevenness)

Color unevenness of the sample was determined by measuring the color in Munsell code at ten randomly selected positions on the surface of the sample with a chromaticity meter CR-400 manufactured by Konica Minolta Sensing Corp. A sample showing a color satisfying the following conditions at all measuring positions in terms of Munsell code (HV/C) was determined to have no color unevenness (○), where H represents hue, V represents lightness and C represents chromaticity. The sample was determined to have no color unevenness (○), in the case of achromatic colors, when hue value H was in a range from 9.0 to 10.0N and, in the case of chromatic color, when hue value H was 5R (red), in a range from 8.0 to 10.0YR (yellowish red) or in a range from 0.1 to 5Y (yellow), lightness value V was in a range from 7.0 to 10.0 and chromaticity value C was in a range from 0.5 to 3.

A sample was determined to have color unevenness (x) when all of the measuring points showed the following colors. The sample was determined to have color unevenness (x), in the case of achromatic colors, when hue value H was less than 9.0N and, in the case of chromatic color, when hue value H was 5R (red), in a range from 8.0 to 10.0YR (yellowish red) or in a range from 0.1 to 5Y (yellow), lightness value V was out of a range from 7.0 to 10.0 and/or chromaticity value C was out of a range from 0.5 to 3.

(Carbon Content)

Carbon content by weight was measured by means of a carbon analyzer (Model EMIA-511 manufactured by Horiba, Ltd.).

(Zr Content)

Content of metal element Zr by weight was measured by the ICP emission spectroscopy similarly to the measurement of the contents of Si, Fe, Al, Ca, Mg, and was converted to the content of $ZrO_2$.

(Etching Rate Ratio)

A sample made of $Y_2O_3$ sintered material of the present invention of which surface was polished to mirror finish and a reference sample of dense alumina sintering (purity 99.9% by weight) of which surface was polished to mirror finish were set in a reactive ion etching apparatus, and were exposed to plasma in a mixed gas atmosphere consisting of 50% by volume of $CF_4$ and 50% by volume of Ar for 100 hours. Etching rate per minute was calculated for both samples from the weight loss after the exposure. Ratio ERB/ERA of the etching rate ERB of the sample made of $Y_2O_3$ sintered material to the etching rate ERA of the sintered alumina was calculated. A sample that showed ERB/ERA of 0.4 or less was determined to be good.

Mean particle size of the powder contained in the slurry after crushing (diameter of equivalent spherical particle corresponding to 50 percentile value of cumulative frequency distribution curve based on volume) was determined by means of laser diffraction/dispersion particle size distribution measuring instrument LA-920 manufactured by Horiba. Heat conductivity, calculated from thermal diffusion rate (laser flash method), specific heat and density according to JIS R 1611, was in a range from 15 to 21 W/m·K.

Contents of the metal elements (Si, Fe, Al, Ca, Mg) in the sample were controlled so that concentrations of the metal elements (Si, Fe, Al, Ca, Mg) in the material after firing became 300 ppm or less for Si in terms of $SiO_2$, 50 ppm or less for Fe in terms of $Fe_2O_3$, 100 ppm or less for Al in terms of $Al_2O_3$ and 350 ppm for AE in terms of AEO, and the metal elements (Si, Fe, Al, Ca, Mg) became as shown in Table 1 during sintering.

Then samples (comparative examples) out of the scope of the present invention were made by sintering similarly to the Example except for changing the $Y_2O_3$ content, contents of the metal elements (Si, Fe, Al, Ca, Mg), mean particle size of the powder after crushing, greasing temperature, firing temperature, temperature raising rate, temperature lowering rate and the kind of material of the firing fixture, and were evaluated similarly to the above.

Results of measuring the samples of the present invention and comparative examples are shown in Tables 1 and 2.

TABLE 1

| Sample No. | $D_P$ μm | $T_D$ °C. | $T_S$ °C. | $V_A$ °C./hour | $V_B$ °C./hour | Firing fixture | $Y_2O_3$ content % by weight | Carbon content ppm | Metal element content in terms of oxide |||||| 
|---|---|---|---|---|---|---|---|---|---|---|---|---|---|---|
| | | | | | | | | | $SiO_2$ ppm | $Fe_2O_3$ ppm | $Al_2O_3$ ppm | CaO ppm | MgO ppm | $ZrO_2$ ppm |
| 1 | 0.84 | 700 | 1650 | 30 | 100 | MgO | 99.9 | 80 | 280 | 22 | 87 | 15 | 72 | 380 |
| 2 | 0.77 | 700 | 1700 | 20 | 100 | MgO | 99.92 | 40 | 214 | 37 | 25 | 88 | 81 | 300 |

TABLE 1-continued

| Sample No. | $D_P$ μm | $T_D$ °C. | $T_S$ °C. | $V_A$ °C./hour | $V_B$ °C./hour | Firing fixture | $Y_2O_3$ content % by weight | Carbon content ppm | Metal element content in terms of oxide | | | | | |
|---|---|---|---|---|---|---|---|---|---|---|---|---|---|---|
| | | | | | | | | | $SiO_2$ ppm | $Fe_2O_3$ ppm | $Al_2O_3$ ppm | CaO ppm | MgO ppm | $ZrO_2$ ppm |
| 3 | 0.45 | 700 | 1700 | 20 | 100 | α-$Al_2O_3$ | 99.93 | 20 | 78 | 28 | 16 | 58 | 64 | 320 |
| 4 | 0.94 | 700 | 1700 | 20 | 100 | α-$Al_2O_3$ | 99.93 | 40 | 219 | 16 | 20 | 75 | 27 | 240 |
| 5 | 0.62 | 850 | 1700 | 20 | 100 | α-$Al_2O_3$ | 99.94 | 30 | 205 | 45 | 21 | 36 | 9 | 230 |
| 6 | 0.89 | 850 | 1700 | 12 | 100 | α-$Al_2O_3$ | 99.95 | 30 | 168 | 47 | 23 | 1 | 1 | 210 |
| 7 | 0.96 | 850 | 1700 | 12 | 100 | α-$Al_2O_3$ | 99.996 | 20 | 8 | 9 | 0 | 0 | 0 | 0 |
| 8 | 0.56 | 850 | 1700 | 12 | 100 | α-$Al_2O_3$ | 99.99 | 20 | 43 | 1 | 0 | 1 | 0 | 30 |
| *9 | 1.32 | 180 | 1750 | 15 | 200 | Mullite ($3Al_2O_3 \cdot 2SiO_2$) | 99.9 | 200 | 231 | 47 | 44 | 117 | 102 | 240 |
| *10 | 1.62 | 1250 | 1600 | 200 | 200 | Gehlenite ($2CaO \cdot Al_2O_3 \cdot SiO_2$) | 99.5 | 110 | 30 | 37 | 50 | 48 | 135 | 4400 |
| *11 | 1.1 | 500 | 1450 | 150 | 200 | Cordierite ($2MgO \cdot 2Al_2O_3 \cdot 5SiO_2$) | 99.8 | 90 | 280 | 21 | 92 | 136 | 185 | 980 |
| *12 | 1.41 | 500 | 2050 | 30 | 200 | $CaO \cdot 6Al_2O_3$ | 99.7 | | broken during firing | | | | | |
| *13 | 1.53 | 500 | 1750 | 200 | 200 | $Al_2O_3 \cdot TiO_2$ | 99.8 | 90 | 290 | 42 | 57 | 98 | 97 | 1140 |
| *14 | 1.8 | 500 | 1750 | 100 | 200 | Mullite ($3Al_2O_3 \cdot 2SiO_2$) | 99.6 | 20 | 380 | 40 | 79 | 108 | 81 | 3240 |
| *15 | 1.26 | 500 | 1750 | 15 | 200 | Mullite ($3Al_2O_3 \cdot 2SiO_2$) | 99.6 | 50 | 260 | 94 | 71 | 82 | 104 | 2500 |
| *16 | 1.38 | 500 | 1750 | 10 | 200 | Mullite ($3Al_2O_3 \cdot 2SiO_2$) | 99.7 | 30 | 201 | 23 | 174 | 106 | 92 | 2000 |
| *17 | 2 | 500 | 1750 | 8 | 200 | Mullite ($3Al_2O_3 \cdot 2SiO_2$) | 99.8 | 80 | 252 | 39 | 71 | 217 | 20 | 990 |

Samples with the symbol * are out of the scope of the present invention.

TABLE 2

| Sample No. | ΔD μm | Ratio of metal element contents | | | | | Bending strength MPa | Tan δ | Density of sintered material g/cm³ | Color unevenness | $ER_B/ER_A$ |
|---|---|---|---|---|---|---|---|---|---|---|---|
| | | Si - | Fe - | Al - | Ca - | Mg - | | | | | |
| 1 | 30 | 4 | 1.2 | 3.1 | 1.5 | 3.2 | 90 | $4.7 \times 10^{-4}$ | 4.95 | ○ | 0.4 |
| 2 | 15 | 3 | 3 | 1.1 | 2.5 | 1.1 | 95 | $2.3 \times 10^{-4}$ | 4.93 | ○ | 0.32 |
| 3 | 8 | 0.9 | 0.7 | 0.8 | 1 | 1 | 105 | $1.2 \times 10^{-4}$ | 4.97 | ○ | 0.3 |
| 4 | 6 | 0.7 | 0.7 | 0.8 | 1.2 | 0.9 | 110 | $1.1 \times 10^{-4}$ | 4.98 | ○ | 0.29 |
| 5 | 5 | 0.7 | 0.9 | 1.1 | 0.9 | 1 | 116 | $1.2 \times 10^{-4}$ | 4.99 | ○ | 0.28 |
| 6 | 3 | 0.9 | 0.5 | 1 | 1 | 1 | 138 | $0.9 \times 10^{-4}$ | 4.97 | ○ | 0.28 |
| 7 | 1 | 0.7 | 1 | — | — | — | 132 | $0.7 \times 10^{-4}$ | 4.97 | ○ | 0.29 |
| 8 | 0 | 0.6 | 1 | — | 1 | — | 138 | $0.5 \times 10^{-4}$ | 5.01 | ○ | 0.28 |
| *9 | 35 | 1.1 | 0.9 | 1.8 | 1.3 | 1.3 | 76 | $43 \times 10^{-4}$ | 4.83 | ○ | 0.62 |
| *10 | 42 | 1 | 0.9 | 1.1 | 0.05 | 0.7 | 78 | $33 \times 10^{-4}$ | 4.81 | ○ | 0.65 |
| *11 | 38 | 0.8 | 1 | 0.9 | 1.3 | 0.1 | 35 | $67 \times 10^{-4}$ | 4.71 | ○ | 0.84 |
| *12 | | | | | | | — | | | | |
| *13 | 48 | 0.9 | 1.2 | 0.1 | 0.6 | 1.2 | 68 | $37 \times 10^{-4}$ | 4.82 | ○ | 0.73 |
| *14 | 49 | 0.15 | 0.1 | 1.2 | 1.3 | 1.1 | 74 | $48 \times 10^{-4}$ | 4.85 | × | 0.7 |
| *15 | 35 | 3.5 | 6.2 | 2 | 2.1 | 2.2 | 62 | $59 \times 10^{-4}$ | 4.86 | × | 0.69 |
| *16 | 53 | 6.1 | 4.2 | 2 | 2.1 | 2.6 | 61 | $61 \times 10^{-4}$ | 4.84 | × | 0.85 |
| *17 | 40 | 5.3 | 2.6 | 3.5 | 5.6 | 6.2 | 58 | $53 \times 10^{-4}$ | 4.86 | × | 0.72 |

Samples with the symbol * are out of the scope of the present invention.

As can be seen from Tables 1 and 2, samples within the scope of the present invention showed excellent characteristics with difference ΔD in mean crystal grain size between surface and inside not larger than 30 μm, dielectric loss tangent tan δ of $2 \times 10^{-3}$ or less, no color unevenness and etching rate ratio ERB/ERA of 0.4 or less.

Comparison of sample No. 1 of which ΔD was 30 μm, sample No. 2 of which ΔD was 15 μm, and samples Nos. 3 through 8 of which ΔD was 8 μm or less showed the following results.

(Contents of Metal Elements)

Upper limits of the ratios of metal element contents in samples No. 1, No. 2 and Nos. 3 through 8 were 4, 3 and 1.2, respectively, showing that a metal element having smaller value of ΔD has a lower value of ratio of content.

(Bending Strength)

Samples No. 1, No. 2 and Nos. 3 through 8 showed bending strength of 90 MPa, 95 MPa and from 105 to 138 MPa, respectively, showing that a metal element having a smaller value of ΔD has higher bending strength.

(Dielectric Loss Tangent Tan δ)

Samples No. 1, No. 2 and Nos. 3 through 8 showed tan δ of $4.7 \times 10^{-4}$, $2.3 \times 10^{-4}$ and from $0.5 \times 10^{-4}$ to $1.2 \times 10^{-4}$ respectively, showing that a metal element having a smaller value of ΔD has a smaller value of tan δ.

(Evaluation of Color Unevenness)

Sample No. 1 showed hue value H of 5R (red), lightness value V in a range from 7.0 to 10.0 and chromaticity value C in a range from 0.5 to 3. Sample No. 2 showed hue value H in a range from 8.0 to 10.0YR, lightness value V in a range from 7.0 to 10.0 and chromaticity value C in a range from 0.5 to 3.0. Samples Nos. 3 and 4 showed hue values H in a range from 1.0 to 5.0Y, lightness value V in a range from 7.0 to 10.0 and chromaticity value C in a range from 0.5 to 2.0. Samples Nos. 5 through 8 showed achromatic color with hue value H of 9.5N, indicating less color unevenness. Thus it was found that a smaller value of ΔD leads to less color unevenness.

(Etching Rate)

Samples No. 1, No. 2 and Nos. 3 through 8 showed etching rate ratios ERB/ERA of 0.4, 0.32 and from 0.62 to 0.85, respectively. Thus it was found that a smaller value of ΔD leads to a smaller value of etching rate ratio ERB/ERA.

(Ratio of Metal Element Contents)

Ratios of metal element contents (Si, Fe, Al, Ca, Mg) were in a range from 0.5 to 4.

Further experiment showed that Al content, in particular, has influence on the difference in mean crystal grain size between the surface and inside of the corrosion resistant member made of the $Y_2O_3$ sintered material.

The samples of the comparative example, in contrast, showed smaller bending strength, large value of dielectric loss tangent tan δ and large etching rate ratio. The samples Nos. 14 through 17 of the comparative example showed color unevenness.

What is claimed is:

1. A corrosion resistant member comprising a $Y_2O_3$ sintered material that includes 99.9% by weight or more Y in terms of $Y_2O_3$, wherein
said $Y_2O_3$ sintered material comprises at least metal element of AE, wherein AE is a group II element of the periodic table, and
wherein a difference in crystal grain size between the surface and the inside region of said $Y_2O_3$ sintered material is not larger than 30 μm.

2. The corrosion resistant member according to claim 1, wherein said $Y_2O_3$ sintered material further comprises any one of Si, Fe and Al.

3. The corrosion resistant member according to claim 1, wherein said $Y_2O_3$ sintered material comprises a non zero amount of Si, Fe, Al and AE (these metallic elements will hereinafter be collectively referred to as metal elements M), in concentrations of 300 ppm of less for Si in terms of $SiO_2$, 50 ppm or less for Fe in terms of $Fe_2O_3$, 100 ppm or less Al in terms of $Al_2O_3$ and 350 ppm or less AE, wherein AE is a group II element of the periodic table, in terms of AEO, wherein AEO is a compound containing the AE and O.

4. The corrosion resistant member according to claim 3, wherein the content ratio of any of the metal elements M contained at and near the surface to that contained deep inside of said $Y_2O_3$ sintered material is in a range from 0.2 to 5.

5. The corrosion resistant member according to claim 1, wherein said $Y_2O_3$ sintered material shows dielectric loss tangent of $2 \times 10^{-3}$ or less in a frequency range from 10 MHz to 5 GHz.

6. The corrosion resistant member according to claim 1, having a carbon content in said $Y_2O_3$ sintered material that is 100 ppm by weight or less.

7. The corrosion resistant member according to claim 1, wherein said $Y_2O_3$ sintered material has void ratio of 5% or less.

8. The corrosion resistant member according to claim 1, wherein said $Y_2O_3$ sintered material has density of 4.8 g/cm³ or higher.

* * * * *